United States Patent [19]

Brown

[11] 4,222,033
[45] Sep. 9, 1980

[54] AUTOMOBILE CUT-OFF ANTI-THEFT SYSTEM

[76] Inventor: Leonard L. Brown, 63 Tucson Dr., Greenville, S.C. 29611

[21] Appl. No.: 25,892

[22] Filed: Apr. 2, 1979

[51] Int. Cl.² .................... B60R 25/04; B60R 25/10
[52] U.S. Cl. ........................... 340/64; 307/10 AT; 180/287
[58] Field of Search ............... 340/52 R, 53, 56, 63, 340/64; 307/10 AT; 180/114, 287

[56] References Cited

U.S. PATENT DOCUMENTS

| 3,614,458 | 10/1971 | Stein | 340/64 |
| 4,107,962 | 8/1978 | MacKinnon | 180/114 |

*Primary Examiner*—Alvin H. Waring
*Attorney, Agent, or Firm*—Bailey, Dority & Flint

[57] ABSTRACT

An automobile anti-theft device ad system terminates operation of the automobile after it has been started and run momentarily by a thief whereby a thief is left, most likely in traffic, with a stalled automobile and an energized audible signal.

4 Claims, 2 Drawing Figures

AUTOMOBILE CUT-OFF ANTI-THEFT SYSTEM

BACKGROUND OF THE INVENTION

Heretofore, much attention has been given to the problem of preventing automobile thefts and devices have been proposed to prevent or hinder such thefts from taking place. One type of device has included an alarm circuit which includes a fuse placed in series with the ignition coil when the alarm circuit is activated such that any attempt to start the automobile results in blowing the fuse which prevents the automobile from being started. Other devices and attempts have been made to provide various forms of switching wherein a secondary on-off switch is hidden somewhere under the dash of the car which must be turned on in order for the automobile to start.

Other attempts have been made to provide an audible signal when various switches are tripped such as by opening a locked car door or by switching devices which sense a drain on the battery such as during starting of the automobile when the alarm circuit is activated.

SUMMARY OF THE INVENTION

It has been found that a highly effective automobile anti-theft device can be had in accordance with the invention which includes an alarm circuit which allows an unauthorized starting of the vehicle and subsequent operation of the vehicle for a short interval of time which is then followed by interruption and stopping of the vehicle operation and simultaneous activation of a horn or other audible signal. Thus, upon successfully starting a stolen vehicle, the thief will encounter, after a short moment of operation, complete cessitation in the operation of the automobile followed by an audible alarm signal. It has been found that normally when a thief encounters such conditions he will have traveled a short distance and be at least partially into traffic and will abandon the automobile and his attempt when unable to restart the vehicle.

Accordingly, an important object of the present invention is the provision of an anti-theft system which is economical, easy to install by the average car owner, and highly effective in preventing automobile theft.

Another important object of the present invention is the provision of an anti-theft device which permits unauthorized start up and operation for a short distance of travel but which prohibits further operation thereafterwards and creates a situation where the thief will be forced to abandon any further effort.

Yet another important object of the present invention is the provision of an anti-theft system which will permit unauthorized start up of an automobile and a short period of travel followed by complete cessation of engine operation and the energization of a highly perceivable audible signal.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
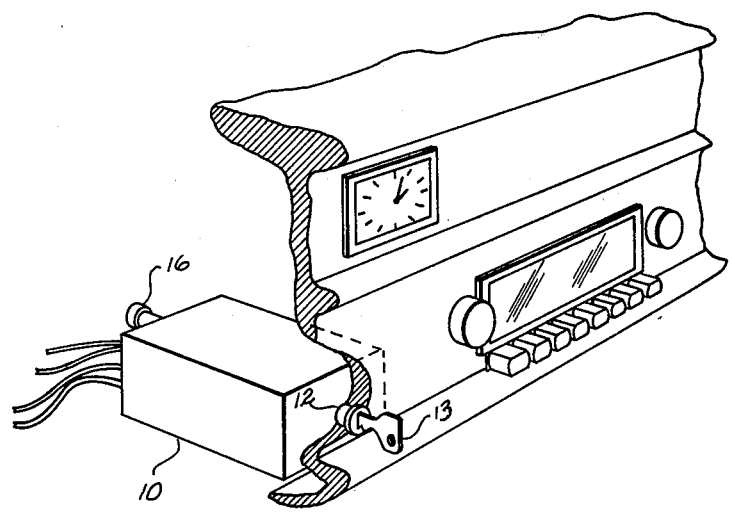
FIG. 1 is a perspective view illustrating the installation of an alarm circuit module in a vehicle dash panel according to the invention.
Figure 2:
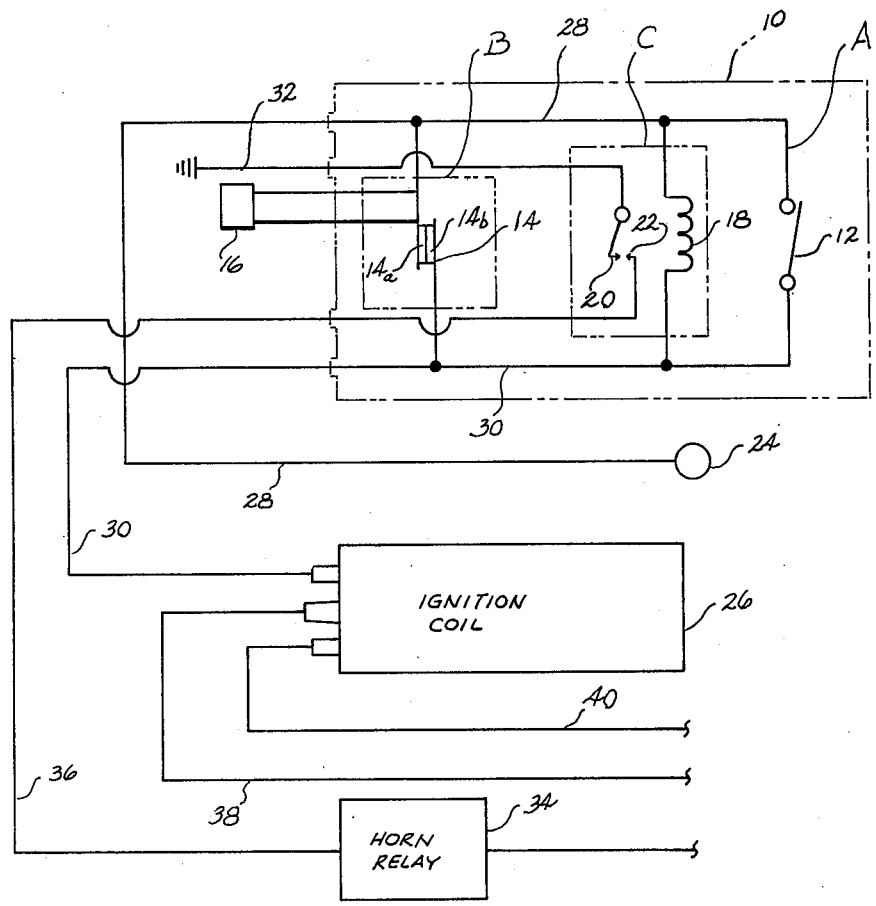
FIG. 2 is a schematic illustration of an anti-theft system and device according to the invention.

The drawing illustrates an automobile anti-theft system for deterring the unauthorized operation and theft of an automobile having a motor whose start-up and operation is controlled by a starter switch. The system includes a switch means and an alarm circuit A activated by the switch means for controlling operation of said automobile when activated and an unauthorized start-up and operation of the automobile is attempted. A first circuit means B is electrically connected in the alarm circuit which permits an initial unauthorized start-up and operation of the automobile when the alarm citcuit is activated; and a delay means is included in the first circuit means which serves to interrupt and stop the unauthorized operation of the automobile after a momentary interval of time following the unauthorized start-up. A second circuit means C is connected in the alarm circuit A which is operatively connected to an audible signal source. The second circuit means C serves to energize the audible signal in response to the interruption and stopping of the automobile operation by the first circuit means B.

As illustrated the automobile cut-off anti-theft device includes an alarm circuit module 10 in which the alarm circuit A is enclosed. The entire circuit may be enclosed in the module so that the alarm circuit module may be easily installed either in the instrument dash of the automobile as illustrated or out of sight such as under the dash. The alarm circuit and system is activated by a switch means in the form of a manually opened and closed switch 12 operated by a key 13. When the switch 12 is open, the alarm system is activated and the key 13 may be removed with switch 12 either in the activated or de-activated (closed) position.

The first circuit B of the alarm circuit may be provided in the form of a breaker circuit and switch 14 having a manual reset button 16 which is connected in parallel with the switch 12. The breaker B may be a conventional breaker circuit which may be set to trip and open the contacts 14a and 14b at approximately 2 amps.

The second circuit C includes a relay circuit having A relay coil 18 connected in parallel with the switch 12 and breaker 14. Relay contacts 20 and 22 are connected in to ground and to the horn relay or horn button.

The alarm circuit may be connected to the existing wires and components of a conventional automobile system as follows. Reference is made to an automobile operated by an internal combustion engine or motor of the type having a spark ignition system, although it is to be understood, of course, that the invention may be applied to other forms of engines such as a diesel engine which utilize compression ignition.

Switch 12 is connected to the hot wire side of a starter switch 24 which normally would feed an ignition coil 26 directly in a conventional system. Such connection is made by a wire lead 28. The other side of switch 12 is connected to the ignition coil 26 by means of wire lead 30. Relay 18 is also connected across leads 28 and 30 in parallel with switch 12 as is the breaker 14. Relay contact 20 is connected to ground by wire lead 32 and contact 22 is connected to a conventional existing horn relay 34 associated with the automobile by means of lead 36. Relay coil 18 is sized to drop the voltage delivered to the ignition coil 26 when switch 12 and breaker 14 are open so that the voltage will not be sufficient to fire the ignition system. However, the voltage across the coil will be sufficient to close relay contacts 20 and 22 and ground the horn relay energize the horn. In those automobiles which do not utilize a horn relay, the lead 36 may be connected directly to the existing horn botton or other audible signal source as may be utilized. In one embodiment a relay coil having an impedance or resistance of 750 ohms was utilized. Leads 38 and 40 exist in a conventional automobile ignition system and are connected, respectively, to the ignition distributor and breaker points or electronic ignition as the case may be.

In operation, when the owner of the automobile leaves the automobile parked, the key 13 is turned so as to open switch 12 and then is removed setting the system and circuit in an activated state. Should an unauthorized intruder seek to start the automobile and drive off, either by utilizing an ignition key or by straight wiring the starter switch, the breaker switch 14 will draw current and allow the automobile to run briefly on the order of 10 to 30 seconds depending on how fast the thief attempts to drive the automobile off. Following this interval of time, the breaker trips and opens the circuit due to the current flowing through breaker 14 to the ignition coil 26 causing the automobile to cease in its operation. However, when the breaker switch opens, the current is shunted through the relay coil 18 causing the relay contacts 20 and 22 to close energizing the horn at the same time that the automobile stops. These conditions will normally occur when the automobile has at least partially entered traffic. Finding himself in this condition, the thief will normally abandon his attempt and the automobile since he has been exposed both by a stopped automobile in the traffic which he cannot restart and by an audible alarm signal.

Should the thief attempt to cut the ignition switch off and restart the automobile after it has stopped, the horn will again blow once the ignition switch is turned on, however, the automobile will not start due to the breaker 16 remaining open. Only after the breaker has been reset by pushing the button 16 will the automobile again be allowed to start. However, even if the thief finds the reset button and restarts the automobile it will stay started only momentarily until the breaker again trips. While the delay circuit provided by breaker circuit B is particularly economical and advantageous, it is to be understood that other forms of delay circuitry for stopping engine operation after a momentary interval may also be utilized. The voltage across the relay coil 18 will be sufficient only to maintain the relay contacts closed but will not be sufficient to allow the automobile to operate.

Thus, it can be seen that a highly effective anti-theft system and device can be had according to the invention which enables momentary success by the thief followed by a situation which the thief will not be able to overcome when exposed thereto and which, in most instances, will lead to abandonment of the attempt.

While a preferred embodiment of the invention has been described using specific terms, such description is for illustrative purposes only, and it is to be understood that changes and variations may be made without departing from the spirit or scope of the following claims.

What is claimed is:

1. An automobile anti-theft system for deterring the unauthorized operation and theft of an automobile having a motor whose startup and operation is controlled by a starter switch through which power is supplied to an ignition coil for motor operation, said system comprising:

an alarm circuit for controlling operation of said automobile when activated and an unauthorized startup and operation of said auotmobile is attempted by an unauthorized person;

switch means for activating said alarm circuit;

first circuit means included in said alarm circuit which includes a time delay circuit electrically connected between said automobile starter switch and ignition coil receiving current when said alarm circuit is activated and said automobile is started to permit an initial unauthorized startup and operation of said automobile;

said time delay circuit interrupting the circuit of said ignition coil to terminate the operation of said automobile following a momentary interval of time;

a second circuit means included in said alarm circuit electrically connected to said first circuit means including a relay circuit energized by current flow shunted therethrough following interruption of said time delay circuit;

an audible signal source connected to said relay; and said relay circuit energizing said audible signal source thus producing an audible signal in response to said flow of shunted current immediately after said momentary interval of time;

whereby interruption of automobile operation is immediately followed by an audible signal to discourage further attempted theft of the automobile.

2. The apparatus of claim 1 wherein said time delay circuit includes a breaker circuit opened in response to current flow during said momentary time interval, said breaker circuit preventing further startup after said initial unauthorized startup.

3. The apparatus of claim 1 wherein said relay circuit energizes said audible signal each time an unauthorized startup is attempted following said initial attempt while creating a sufficient voltage drop thereacross to prevent ignition in said ignition coil.

4. The system of claim 2 wherein said switch means is connected to receive current from said starter switch during startup and operation and is open to activate said system and alarm circuit;

said breaker circuit being connected in parallel with said switch means which receives current from said starter switch when said switch means is open; and said relay circuit having a relay coil connected in parallel with said switch means and said breaker circuit whereby current is shunted through said relay upon opening of said breaker circuit.

* * * * *